United States Patent
Monson et al.

(10) Patent No.: US 9,963,344 B2
(45) Date of Patent: May 8, 2018

(54) METHOD TO SYNTHESIZE BULK IRON NITRIDE

(71) Applicants: National Technology & Engineering Solutions of Sandia, LLC, Albuquerque, NM (US); Enrique J. Lavernia, Laguna Beach, CA (US); Baolong Zheng, Woodland, CA (US); Yizhang Zhou, Irvine, CA (US)

(72) Inventors: Todd Monson, Albuquerque, NM (US); Enrique J. Lavernia, Laguna Beach, CA (US); Baolong Zheng, Woodland, CA (US); Yizhang Zhou, Irvine, CA (US)

(73) Assignee: National Technology & Engineering Solution of Sandia, LLC, Albuquerque, NM (US)

( * ) Notice: Subject to any disclaimer, the term of this patent is extended or adjusted under 35 U.S.C. 154(b) by 311 days.

(21) Appl. No.: 15/002,220

(22) Filed: Jan. 20, 2016

(65) Prior Publication Data

US 2016/0207769 A1 Jul. 21, 2016

Related U.S. Application Data

(60) Provisional application No. 62/105,918, filed on Jan. 21, 2015.

(51) Int. Cl.
*C04B 35/58* (2006.01)
*H01F 1/08* (2006.01)
(Continued)

(52) U.S. Cl.
CPC .... *C01B 21/0622* (2013.01); *C04B 35/58042* (2013.01); *C04B 35/6264* (2013.01);
(Continued)

(58) Field of Classification Search
CPC ........ C04B 35/58042; C04B 2235/666; C04B 35/62615; H01F 1/086
See application file for complete search history.

(56) References Cited

U.S. PATENT DOCUMENTS

| | | | | |
|---|---|---|---|---|
| 2,872,292 A | * | 2/1959 | Altmann | C01B 21/0622 252/62.51 R |
| 4,133,678 A | * | 1/1979 | Sarian | C21C 7/00 423/409 |

(Continued)

OTHER PUBLICATIONS

Libardi S. et al. "Mechanical properties of nanostructured and ultrafine-grained iron alloys produced by spark plasma sintering of ball milled powders". Materials Science and Engineering: A, vol. 478, Issues 1-2, Apr. 15, 2008, pp. 243-250. (Year: 2008).*

(Continued)

*Primary Examiner* — Erin Snelting
(74) *Attorney, Agent, or Firm* — Kevin W. Bieg

(57) ABSTRACT

Bulk iron nitride can be synthesized from iron nitride powder by spark plasma sintering. The iron nitride can be spark plasma sintered at a temperature of less than 600° C. and a pressure of less than 600 MPa, with 400 MPa or less most often being sufficient. High pressure SPS can consolidate dense iron nitrides at a lower temperature to avoid decomposition. The higher pressure and lower temperature of spark discharge sintering avoids decomposition and limits grain growth, enabling enhanced magnetic properties. The method can further comprise synthesis of nanocrystalline iron nitride powders using two-step reactive milling prior to high-pressure spark discharge sintering.

7 Claims, 8 Drawing Sheets

(51) Int. Cl.
   *C01B 21/06* (2006.01)
   *C04B 35/626* (2006.01)
   *C04B 35/645* (2006.01)

(52) U.S. Cl.
   CPC ...... *C04B 35/62615* (2013.01); *C04B 35/645* (2013.01); *H01F 1/086* (2013.01); *C01P 2004/62* (2013.01); *C01P 2004/64* (2013.01); *C04B 2235/3852* (2013.01); *C04B 2235/405* (2013.01); *C04B 2235/5436* (2013.01); *C04B 2235/5454* (2013.01); *C04B 2235/656* (2013.01); *C04B 2235/666* (2013.01); *C04B 2235/77* (2013.01); *C04B 2235/81* (2013.01)

(56) References Cited

U.S. PATENT DOCUMENTS

| | | | | |
|---|---|---|---|---|
| 5,516,595 | A * | 5/1996 | Newkirk | C04B 35/652 428/307.7 |
| 2004/0258552 | A1* | 12/2004 | Shimada | H01F 1/26 419/30 |
| 2006/0153728 | A1* | 7/2006 | Schoenung | B22F 9/04 419/32 |
| 2008/0166255 | A1* | 7/2008 | Yang | C22C 1/04 419/30 |
| 2010/0068512 | A1* | 3/2010 | Imaoka | B82Y 30/00 428/336 |
| 2012/0181475 | A1* | 7/2012 | Ozeki | H01F 1/0572 252/62.51 R |
| 2013/0280119 | A1* | 10/2013 | Okamura | C22C 45/02 419/38 |
| 2014/0301885 | A1* | 10/2014 | Taihaku | C22C 38/00 419/10 |
| 2015/0084727 | A1* | 3/2015 | Ozeki | C22C 38/002 335/302 |
| 2015/0147217 | A1* | 5/2015 | Johnson | H01F 1/0579 419/23 |
| 2015/0380135 | A1* | 12/2015 | Wang | H01F 1/055 428/220 |

OTHER PUBLICATIONS

Munir, Z.A. et al. "The effect of electric field and pressure on the synthesis and consolidation of materials: A review of the spark plasma sintering method". Journal of Materials Science, vol. 41, Issue 3, Feb. 2006, pp. 763-777. (Year: 2006).*

Gaffet, E. et al. "Mechanical Processing for Nanomaterials". Encyclopedia of Nanoscience and Nanotechnology, vol. X, Jan. 2004, pp. 1-39. (Year: 2004).*

Saito, T. "Production of Sm—Fe—N bulk magnets by spark plasma sintering method". Journal of Magnetism and Magnetic Materials, vol. 369, Jun. 18, 2014, pp. 184-188. (Year: 2014).*

Ito, S. et al., "HIP Sintering and Saturation Magnetization of Fe4N", J. Jpn Soc. Powder Metall. 43 (1996), pp. 1415-1419.

Kayani, Z.N. et al., "Structural and Magnetic Properties of Thin Film of Iron Nitride", Surface Review and Letters 21 (2014), pp. 1450013-1-1450013-5.

Prieto, P. et al., "Structural, Chemical and Magnetic Characterization of Iron Nitride Thin Films", Surface and Interface Analysis 38 (2006), pp. 392-395.

* cited by examiner

METHOD TO SYNTHESIZE BULK IRON NITRIDE

CROSS-REFERENCE TO RELATED APPLICATION

This application claims the benefit of U.S. Provisional Application No. 62/105,918, filed Jan. 21, 2015, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to metal nitrides and, in particular, to a method to synthesize bulk iron nitrides (e.g. $\gamma'$-$Fe_4N$, $\alpha''$-$Fe_{16}N_2$, FeN).

BACKGROUND OF THE INVENTION

New soft magnetic materials will be vital for the next generation of power electronics for a broad set of applications including the electrical grid, transportation, and defense applications. Additionally, new hard (permanent) magnetic materials will be required in the next generation of electrical motors, generators, actuators, and other devices. Current state-of-the-art soft magnetic materials do not meet the needs of power electronics, particularly next generation systems envisioned to operate at high frequencies (>1 kHz). Additionally, the best performing soft magnetic materials are costly to manufacture. The best performing permanent magnets contain significant quantities of rare earth elements. Because these minerals are expensive and in limited supply, alternative materials must be developed to replace rare earth based magnets in motors, generators, and actuators. Iron nitrides (e.g. $\gamma'$-$Fe_4N$, $\alpha''$-$Fe_{16}N_2$, and FeN), are comprised entirely of low-cost and abundant elements, and will enable better performing soft and hard magnetic materials. See S. Bhattacharyya, *J. Phys. Chem. C* 119, 1601 (2015).

Iron nitrides have been known and studied for many decades due to their impressive mechanical and magnetic properties. See A. Fry, *Stahl Eisen* 43, 12 (1923); K. H. Jack, *Proc. R. Soc. A* A208, 200 (1951); T. K. Kim and M. Takahashi, *Appl. Phys. Lett.* 20, 492 (1972); S. Okamoto et al., *J. Appl. Phys.* 85, 4952 (1999); A. Leineweber et al., *Phys. B* 276/278, 266 (2000); and M. Tayal et al., *Surface and Coatings Technology* 275, 264 (2015). According to experimental results from thin films and theoretical calculations, iron nitrides should have magnetic moments well in excess of current state of the art magnetic materials. See Y. Takagi et al., *Phys. Rev. B* 81, 035422 (2010); S. Bhattacharyya, *J. Phys. Chem. C* 119, 1601 (2015); and Z. N. Kayani et al., *Surface Review and Letters* 21, 1450013 (2014).

Therefore, $\gamma'$-$Fe_4N$ (a soft magnet) would be ideally suited for use in applications such as transformer and inductor cores. Conversely, $\alpha''$-$Fe_{16}N_2$ and FeN could serve as replacements for current state-of-the-art permanent magnets. Most iron nitrides have only been fabricated as thin films, powder, or inclusions in other materials. See Z. N. Kayani et al., *Surface Review and Letters* 21, 1450013 (2014); and P. Prieto et al., *Surface and Interface Analysis* 38, 392 (2006). Bulk iron nitrides have rarely been fabricated because a high sintering temperature is required to fully consolidate these materials using conventional sintering processes. In particular, the decomposition of iron nitrides on heating to approximately 670° C. is problematic. See S. Ito, *J. Jpn Soc. Powder Metall.* 43, 1415 (1996).

Therefore, a need remains for a viable, low cost, and scalable method to synthesize bulk iron nitrides.

SUMMARY OF THE INVENTION

The present invention is directed to a method to synthesize bulk iron nitride, comprising providing an iron nitride powder and consolidating the iron nitride powder by spark plasma sintering (SPS) to provide a bulk iron nitride. The iron nitride can be spark plasma sintered at a temperature of less than 600° C. and a pressure of less than 600 MPa, with 400 MPa or less most often being sufficient. High pressure SPS can consolidate dense iron nitrides at a lower temperature to avoid decomposition. The lower temperature of SPS also limits grain growth and allows for enhanced magnetic properties. The method can further comprise synthesis of nanocrystalline iron nitride powders using two-step reactive milling prior to high pressure SPS.

BRIEF DESCRIPTION OF THE DRAWINGS

The detailed description will refer to the following drawings, wherein like elements are referred to by like numbers.

FIG. 1(a) is a schematic illustration of cryomilling. FIG. 1(b) is a schematic illustration of milling in an ammonia atmosphere at room temperature (milling can also occur above or below room temperature). FIG. 1(c) is a schematic illustration of spark plasma sintering.

FIG. 3(d) shows the surface of a toroid sintered at 798 K and 100 MPa.

DETAILED DESCRIPTION OF THE INVENTION

Figures 1A, 1B, 1C:
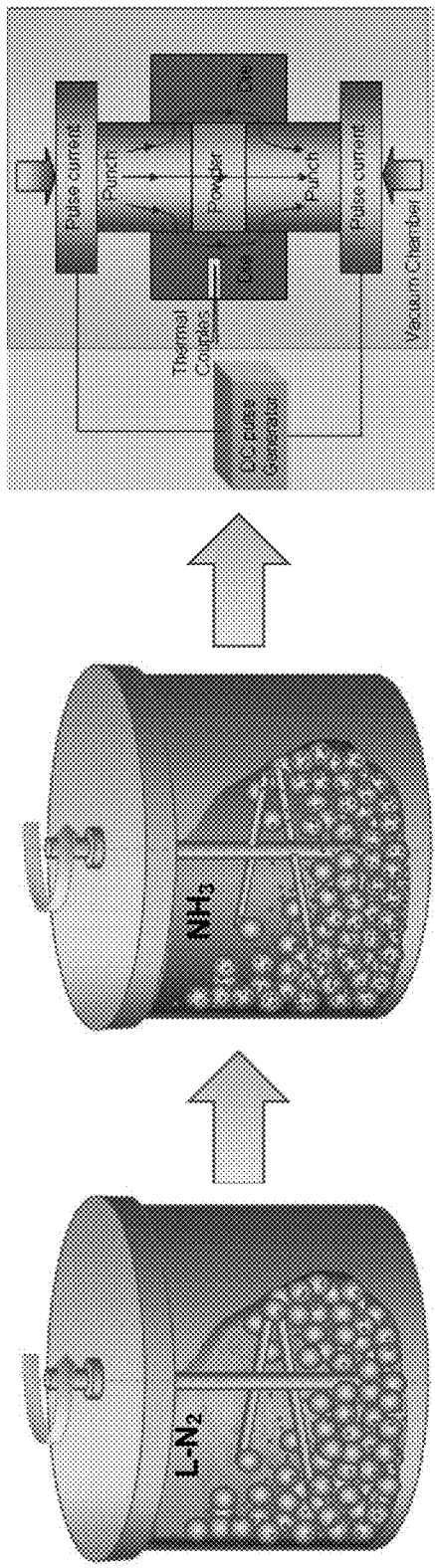
FIGS. 1(a)-(c) illustrate two-step milling and high-pressure spark plasma sintering (SPS) processing.

Spark plasma sintering (SPS), sometimes referred to as a field-assisted sintering technique (FAST), is an attractive consolidation method that uses pulsed current and pressure assistance, as shown in FIG. 1(c). SPS is an attractive consolidation technique due to its relatively low sintering temperature (well under 1000° C.), fast heating rate, and brief consolidation cycles (on the order of minutes). According to the present invention, dense bulk iron nitrides (e.g. $\gamma'$-$Fe_4N$, $\alpha''$-$Fe_{16}N_2$, FeN) can be synthesized from iron nitride starting powders using SPS. SPS enables the direct consolidation and shaping of crystalline $\gamma'$-$Fe_4N$ transformer and inductor cores from raw starting materials in a matter of minutes, without the decomposition that can occur using conventional sintering techniques. See S. Ito, *J. Jpn Soc. Powder Metall.* 43, 1415 (1996). As an example of the invention, consolidated $\gamma'$-$Fe_4N$ samples were prepared using SPS and the microstructure was evaluated using X-ray diffraction (XRD), scanning electron microscopy (SEM), and transmission electron microscopy (TEM). Their magnetic properties were also measured and evaluated. The underlying mechanisms of interface bonding formation, thermal stability, and phase transition were also examined.

Figure 2A:
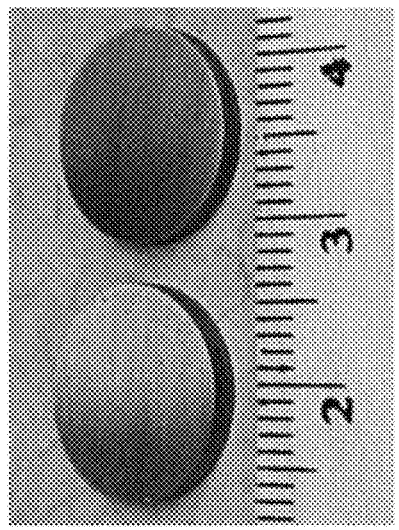
FIG. 2(a) is a scanning electron micrograph of the morphology of as-received FeN powder.
Figure 2B:
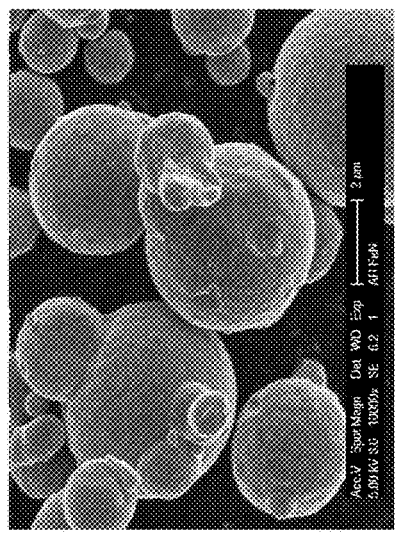
FIG. 2(b) is a photograph of SPSed $\gamma'$-$Fe_4N$ discs.
Figure 2C:
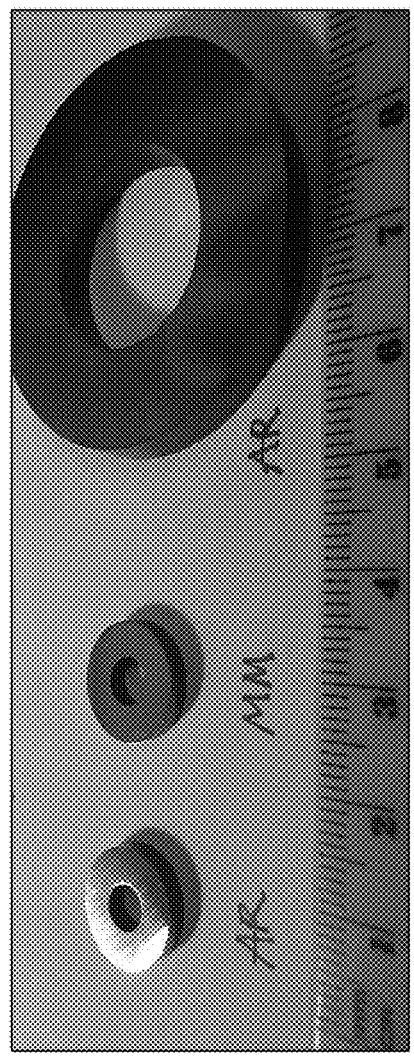
FIG. 2(c) is a photograph of SPS net-shaped (shaped directly into a final part during sintering with no machining) $\gamma'$-$Fe_4N$ toroids.

Bulk $\gamma'$-$Fe_4N$ samples were consolidated via SPS using a SPS-825S DR. SINTER (SPS Syntex Inc., Japan) with a maximum pulse DC output of 12 V and 8000 A under a vacuum condition (lower than 2 Pa). The starting material used in this example was as-received (AR) commercial $Fe_xN$ (x=2-4) powder from Alfa Aesar. This material exhibited a particle size of smaller than 45 μm, as shown in FIG. 2(a). Prior to SPS processing, the powders were loaded in an assembled die of graphite (dies can also be manufactured using SiC). The sintered disc samples had a diameter of 10 mm and thickness of 2 mm, as shown in FIG. 2(b). SPS was performed at different temperatures for 3 minutes of holding time and sintering pressure of 100 to 400 MPa. The disc samples and different SPS processing parameters are listed in Table 1. The purpose of using different sintering temperatures and pressure was to investigate their influence on the density, phase transformation, and magnetic behavior of sintered iron nitride. As shown in FIG. 2(c), three toroids were directly net-shaped using SPS (798 K and 100 MPa) with AR and mechanical milled (MM) $Fe_xN$ powder, eliminating any need for machining.

TABLE 1

Process conditions for SPS sintering AR $Fe_xN$ powder.

| Sample | Temperature (K) | Pressure (MPa) | Time (min) |
|---|---|---|---|
| 1 | 773 | 100 | 3 |
| 2 | | 200 | |
| 3 | | 400 | |
| 4 | | 500 | |
| 5 | 798 | 200 | |
| 6 | 823 | 100 | |
| 7 | | 200 | |
| 8 | | 350 | |

The microstructure and interfaces between grains in the SPSed $\gamma'$-$Fe_4N$ were studied using a scanning electron microscope (SEM), energy dispersive X-ray spectroscopy (EDS), and transmission electron microscope (TEM). Thin foils for TEM observations were prepared via mechanical grinding and polishing to a thickness of about 30 μm, followed by ion milling to a thickness of electron transparency until perforation occurred. XRD with Cu K$\alpha$ radiation was utilized for phase identification, and differential scanning calorimeter (DSC) was used for thermal stability studies. The magnetic behavior of the consolidated bulk $\gamma'$-$Fe_4N$ materials was measured using a magnetic property measurement system (MPMS-7) from Quantum Design.

Microstructure of SPSed FeN

Figure 3B:
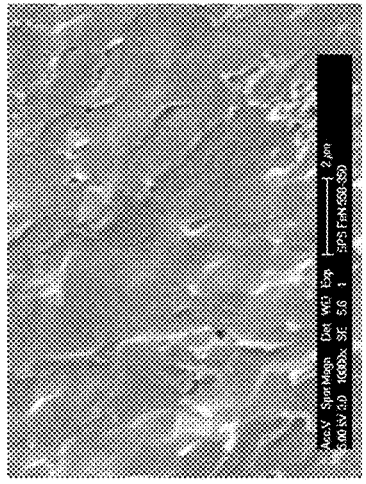
FIGS. 3(a)-(d) are scanning electron micrographs of $\gamma'$-$Fe_4N$ samples SPSed at different pressures. The samples shown in FIGS. 3(a) and 3(b) were prepared at 823 K and 350 MPa. The sample shown in FIG. 3(c) was prepared at 823 K and 100 MPa.
Figure 3D:
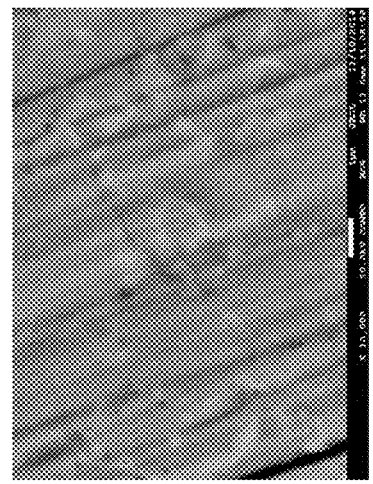
Figure 3A:
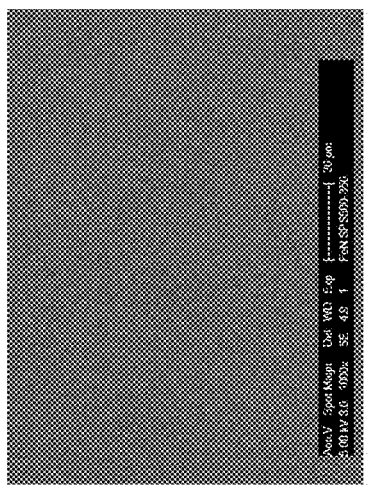
Figure 3C:
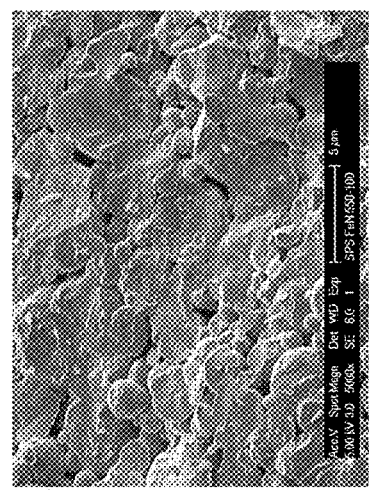

A typical microstructure of SPSed $\gamma'$-$Fe_4N$ (at 823 K and 350 MPa) is shown in FIG. 3(a). The microstructure exhibits uniform contrast without a second phase evident at low magnification in the polished sections. These SPSed $\gamma'$-$Fe_4N$ samples achieved close to full densification, without visible porosity. The interfaces between grains are not evident in the SEM, suggesting that the interface bonding between particles was enhanced by SPS. A small volume fraction (approximately 0.8 vol. %) of pores was observed in the microstructure of the sample SPSed at 823 K and 350 MPa, shown in FIG. 3(b). It was also observed that the density of SPSed $\gamma'$-$Fe_4N$ samples increased with an increase in the SPS pressure, as shown by comparing FIG. 3(b) and an SEM for the sample SPSed at 823 K and 100 MPa shown in FIG. 3(c). The fractured surfaces shown in FIGS. 3(b) and 3(c) reveal the trans-particle fracture features of the $\gamma'$-$Fe_4N$ particles. The presence of trans-particle fracture surfaces suggests strong particle-particle bonding formation in SPSed $\gamma'$-$Fe_4N$ and effective load transfer. There is a variation of contrast around the boundary of grains observed at high magnification, as shown in FIG. 3(d). The compositional variation around the particles from an EDS test is shown in Table 2. A small variation was found in the composition between the grain boundaries and centers. The stoichiometry in the center of the grains is close to $Fe_4N$, whereas the iron concentration at grain boundaries (GBs) is about 3 atomic percent richer than that in particle center.

TABLE 2

Composition variation around the particles in SPSed $\gamma'$-$Fe_4N$.

| Location | Fe (at. %) | N (at. %) |
|---|---|---|
| Particle center | 81.3 | 18.7 |
| Particle boundary | 84.2 | 15.8 |

Figure 4:
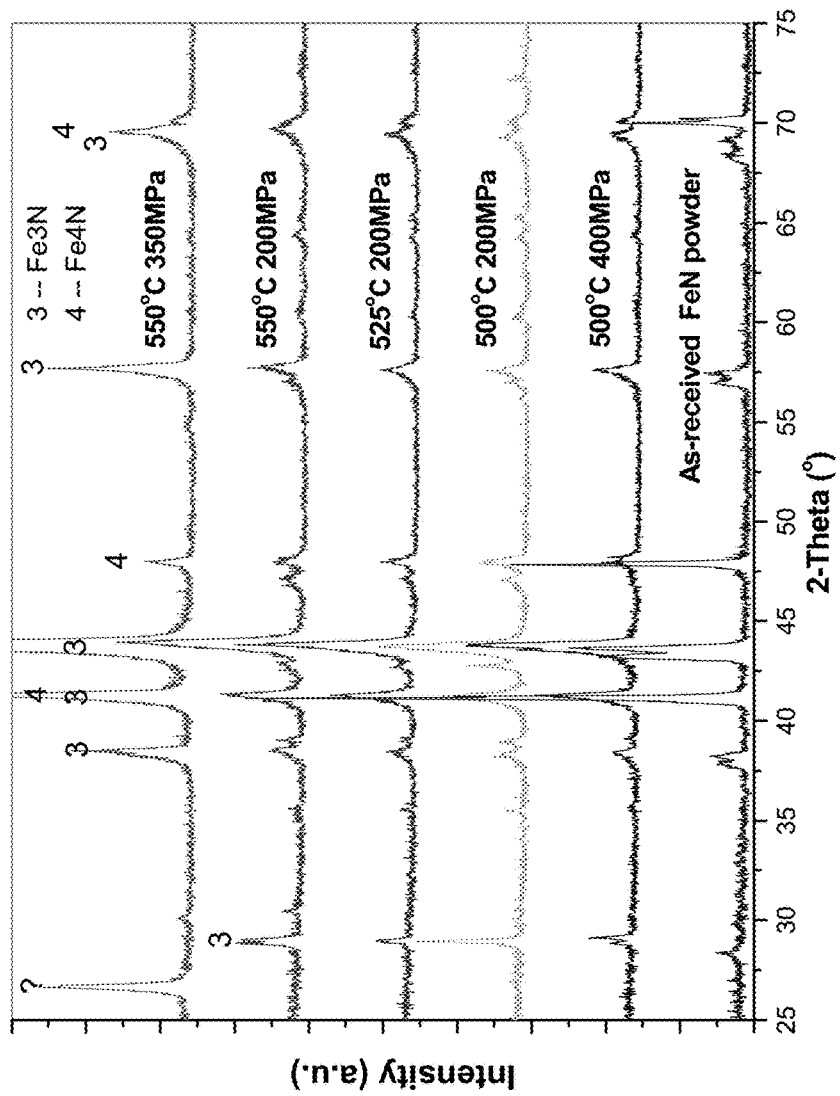
FIG. 4 shows X-ray diffraction (XRD) patterns of SPSed $\gamma'$-$Fe_4N$ bulk samples with different sintering conditions.

FIG. 4 shows the XRD patterns corresponding to $Fe_xN$ SPSed at 773 K, 798 K, and 823 K and with different pressures ranging from 100 MPa to 400 MPa. The XRD patterns indicate that SPSed $Fe_xN$ contains mainly two crystal phases, namely $Fe_4N$ and $Fe_3N$. One $Fe_xN$ sample sintered at 823 K and 350 MPa showed a peak around a 2θ of 26°, likely due to decomposition of iron nitride, which might occur during SPS in regions with a localized higher temperature. Other SPSed $Fe_xN$ samples sintered at different conditions did not show an obvious peak around a 2θ of 26°. As an important note, high pressure applied during SPS can suppress the decomposition of $Fe_xN$ during sintering.

Figure 5:
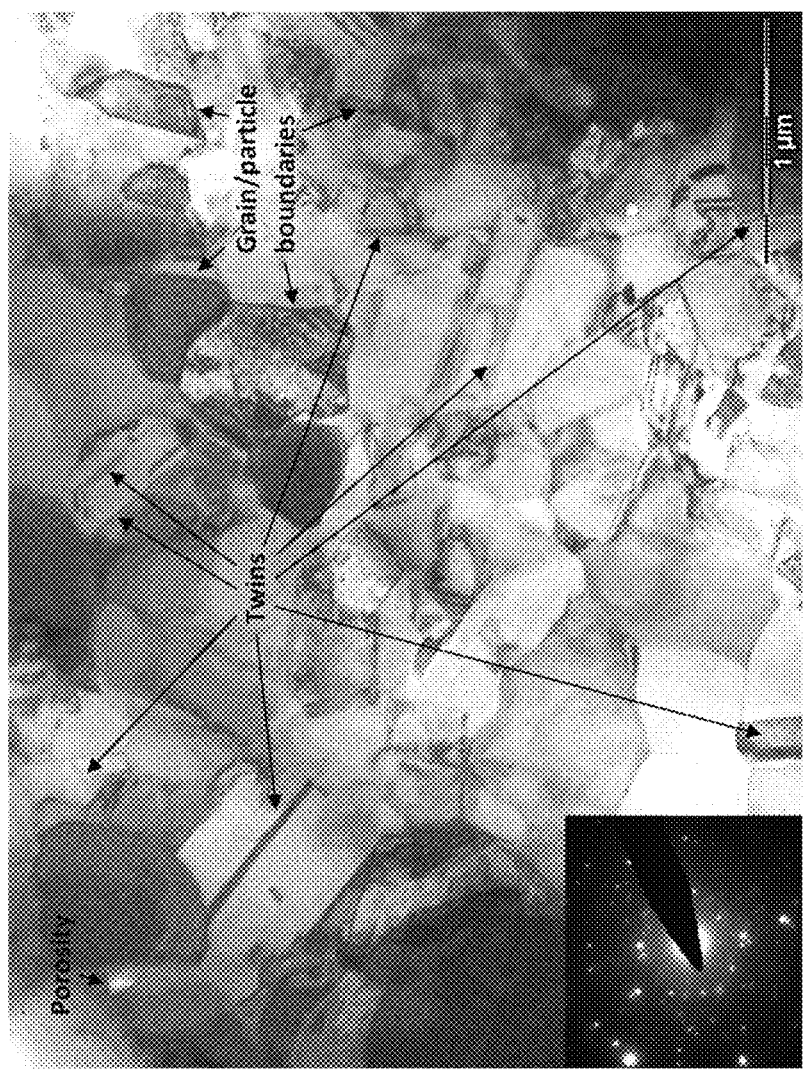
FIG. 5 is a bright-field transmission electron micrograph with selective area diffraction of SPSed $\gamma'$-$Fe_4N$ at 823 K and 200 MPa.

To correlate magnetic properties of sintered $\gamma'$-$Fe_4N$ samples with their microstructure, the microstructure and interface of a characteristics of the sample SPSed at 823 K and 200 MPa was further investigated by TEM analyses. A bright field TEM micrograph of the microstructure of SPSed $\gamma'$-$Fe_4N$ is shown in FIG. 5. The grain size of SPSed $\gamma'$-$Fe_4N$ ranged from 200 nm to 1 μm. The $\gamma'$-$Fe_4N$ particles were well consolidated with little porosity observed. The interfaces between particles disappeared, whereas some visible interfaces accompanying limited voids existed. Selected area electron diffraction (SAED) analysis demonstrated that the crystalline phase consists of $Fe_4N$ and $Fe_3N$ phases. The $Fe_4N$ phase is cubic with a Fe-sub-lattice arranged in a FCC structure and nitrogen atoms occupying the body center position. Abundant twins were also observed in some SPSed $Fe_xN$ grains. Twin boundaries (TBs) can greatly improve the strength and ductility of SPSed $\gamma'$-$Fe_4N$.

Properties of SPSed FeN

Figure 6:
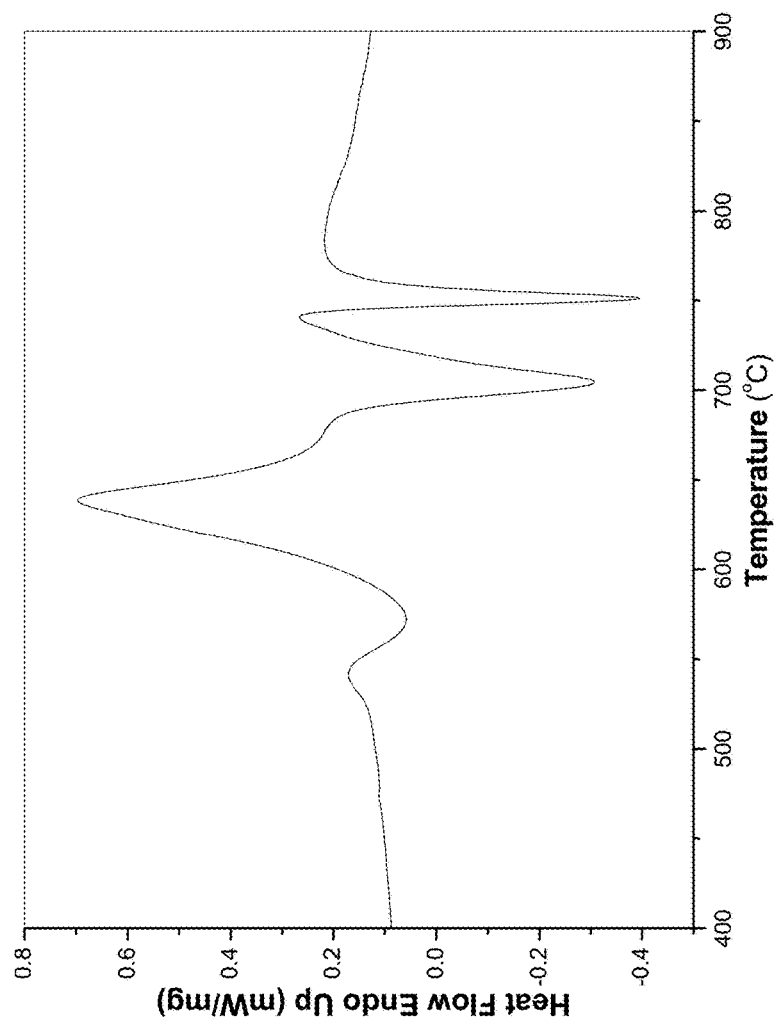
FIG. 6 is a plot of the differential scanning calorimetry pattern of a $\gamma'$-$Fe_4N$ sample SPSed at 823 K and 200 MPa.

Differential scanning calorimetry (DSC) was used to investigate the thermal stability of the SPSed bulk FeN, as shown in FIG. 6. There is an exothermic event beginning at 873 K during heating of sintered γ'-Fe$_4$N that corresponds to the decomposition. The low thermal stability of iron nitrides indicates their consolidation using SPS is a viable route to form dense bulk iron nitride samples without simultaneous decomposition.

Figure 7:
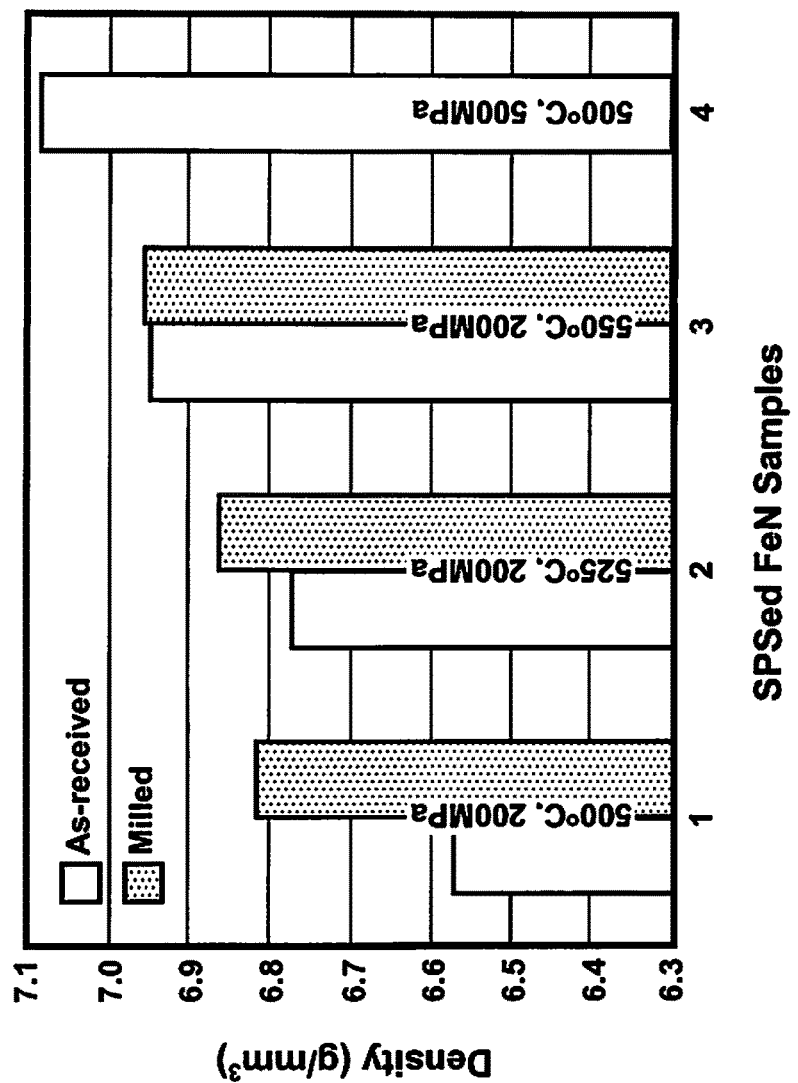
FIG. 7 is a bar graph showing the variation of density of bulk SPSed $\gamma'$-$Fe_4N$ samples with the as-received FeN powder.

The density of SPSed Fe$_x$N has been recorded as a function of SPS temperature and pressure, as shown in FIG. 7. The density increases with increasing SPS temperature and pressure. A density of 7.08 g/cm$^3$ was achieved by sintering as-received Fe$_x$N powder at 773 K and 500 MPa. For comparison, the density of a SPSed Fe$_x$N sample with 4-hour mechanical milled Fe$_x$N powder (by s high energy SPEX miller) was also measured. The density of the SPSed milled Fe$_x$N powder is significantly higher than that with AR FeN powder under the same SPS processing conditions. This may be related to changes in the particle size and grain size of milled FeN powder. A high packing density can be achieved with a smaller particle size, as well as high diffusion ability with the smaller grains of milled powder. There is a higher degree of variation in the density of the SPSed FeN with AR powder, as compared with milled FeN powder.

Figure 8:
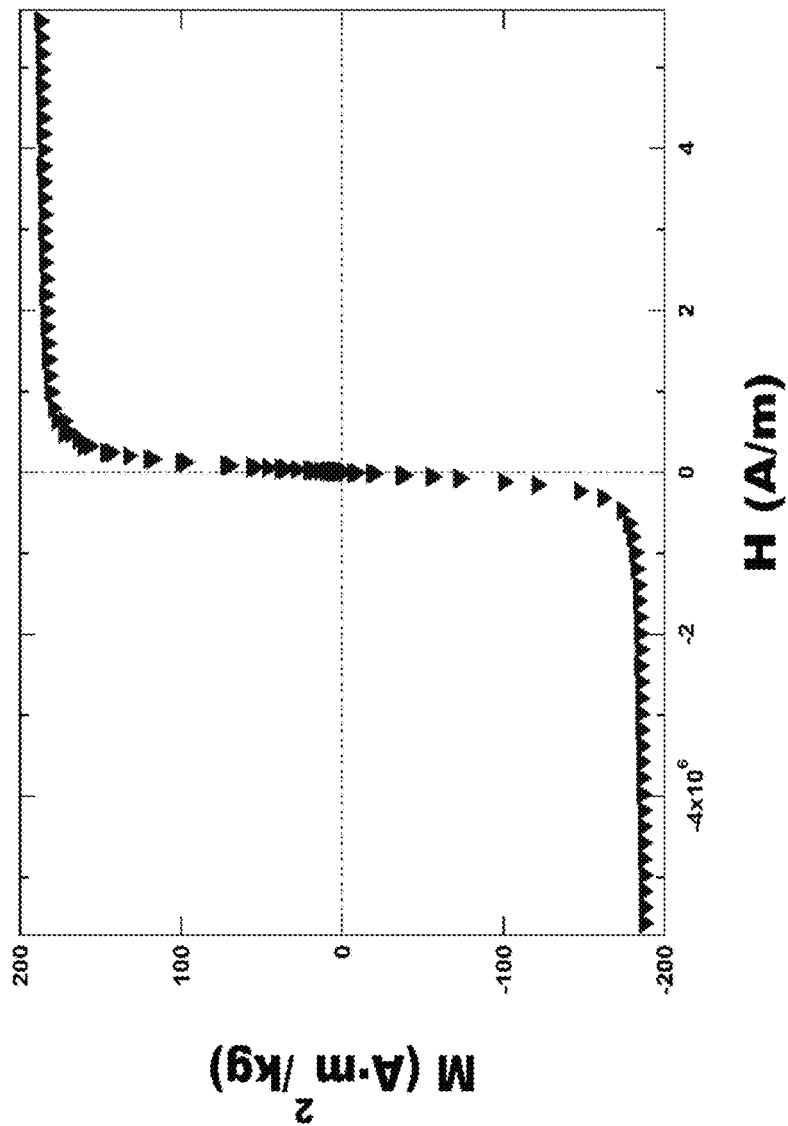
FIG. 8 is a graph of the magnetization as a function of applied field of a SPSed $\gamma'$-$Fe_4N$ sample.

Magnetic properties of the SPSed FeN samples were also investigated. FIG. 8 shows the magnetic hysteresis (M-H curve) of an γ'-Fe$_4$N powder SPSed at 823 K and 100 MPa. This sample achieved a magnetic saturation (M$_s$) of 188 Am$^2$/kg, which is much higher than that of conventional soft magnetic materials and only slightly less than the 209 Am$^2$/kg predicted for phase pure γ'-Fe$_4$N. M$_s$ increased with the density of SPSed FeN. Consolidation of iron nitride generally requires high temperatures and pressures. However, the low thermal stability of Fe$_x$N (~873 K) limits the use of temperatures in excess of ~650° C. Therefore, the present invention is directed to the use of SPS for consolidating fully dense bulk iron nitrides. The SPS process represents a multiple-field problem in which the electric, thermal, and displacement (i.e., shrinkage) fields are intimately coupled via a material response. This problem is strongly nonlinear since each field interacts with each other and affects the properties of SPSed materials. The consolidation of iron nitrides with SPS is related to the deformation behavior of each particle, which also depends on internal defects (i.e., GBs, dislocations, twins, vacancies, etc.), as well as the local pressure, temperature, and possibly an electrical spark discharge phenomenon at the interface between particles. In particular, spatial variations in the thermal and stress fields are likely conditions that can locally promote grain growth. During SPS, a pulsed current passes though both the die and the conductive powder, promoting thermal energy and mass transfer. The thermal energy generated in the graphite die from Joule heating is transferred to the powder via conduction with limited radiation; however, local increases in temperature will occur from the combination of a small contact area and a high local current density. A FEM simulation in the early stage of sintering during SPS was performed to examine this. Contact areas contained higher current and heat flux, and flat contact areas contained twice as much current/heat flux as slanted contact areas. The heat transfer in the sintered particles can be expressed in the thermal energy equation as follows:

$$\frac{1}{r^2}\frac{\partial}{\partial r}\left(kr^2\frac{\partial T}{\partial r}\right) + \frac{1}{r^2\sin^2\theta}\frac{\partial}{\partial \phi}\left(k\frac{\partial T}{\partial \phi}\right) + \\ \frac{1}{r^2\sin\theta}\frac{\partial}{\partial \theta}\left(k\sin\theta\frac{\partial T}{\partial \theta}\right) + q = \rho c_p \frac{\partial T}{\partial t} \quad (1)$$

where ρ is density, c$_p$ is specific heat, and q is energy rate generated per unit volume for conduction analysis with spherical coordinates (r, ϕ, θ). See F. P. Incropera and D. P. DeWitt, *Fundamentals of Heat and Mass Transfer*, John Wiley & Sons, Inc, New York, 1996. In the case of micron-sized particles, the internal temperature is equilibrated within several milliseconds. However, during SPS processing, the continuity of the electric field is disrupted by the presence of multiple interfaces. A local increase in temperature from electrical Joule heating can be calculated using Joule's law, as:

$$T = I^2 \cdot R \cdot t / m \cdot c_p \quad (2)$$

where I is the electric current, R is electric resistance, t is time, m is the mass, and c$_p$ is the specific heat of SPSed materials. It has been proposed that a spark discharge may occur at inter-particle regions, leading to localized partial melting and perhaps even to the formation of a metallic vapor (or plasma, whose existence has yet to be unambiguously demonstrated) as a result of elevated localized temperatures. See R. Orrù et al., *Materials Science and Engineering: R: Reports* 63, 127 (2009); and Z. A. Munir et al., *J. Mater. Sci.* 41, 763 (2006). Under the influence of the pressure, thermal and electromagnetic fields, constricted geometries or "necks" are formed around the contact area between the particles by localized heating and localized high stress (surface activation). These necks gradually develop and plastic deformation progresses during sintering, resulting in densification. Meanwhile, grain growth or decomposition is possible in the contact area between particles due to the activation of localized higher temperature and stress. See F. R. N. Nabarro, *Scripta Materialia* 39, 1681 (1998); and A. J. Haslam et al., *Acta Materialia* 51, 2097 (2003). Fe$_x$N is partially decomposed on the particle boundary, resulting in the decrease of N and relative increase of Fe because the localized temperature in the particle boundary was higher than the 873 K decomposition temperature of Fe$_x$N.

As shown in FIG. 5, many twins are present in SPSed FeN. The strength and ductility of SPSed FeN is enhanced because twin boundaries can greatly improve the strength and ductility of brittle materials. Dislocation accumulation in twin boundaries in brittle materials, such as carbides and nitrides, provides for strength enhancement with some ductility. See Y. Li et al., *Phil. Mag.* 90, 783 (2010); L. Lu et al., *Science* 304, 422 (2004); and B. Zheng et al., *Phil. Mag. Let.* 93, 457 (2013). Thus, SPSed iron nitride might gain some plasticity. The formation of twins can thermodynamically decrease the total interfacial energy, because the excess energy for coherent twin boundaries is much smaller than that for conventional high angle grain boundaries. It was reported that twins prefer to nucleate at grain boundaries to reduce the sum of the interfacial energies (including grain boundaries and twin boundaries) by means of the twinning-induced orientation change. See L. Lu et al., *Science* 304, 422 (2004).

As indicated in FIG. 7, the milled Fe$_x$N powders were found to exhibit a marked improvement in density after SPS processing relative to results obtained with AR spherical Fe$_x$N powders. One of the reasons for this is attributed to the differences in particle morphology and an increase in surface area per unit volume. The AR FeN powders have a spherical shape with a smooth surface whereas the milled powders have an irregular morphology and rough surface, as well as smaller average size. Surface area per unit volume and curvature both increase with decreasing particle size, resulting in a higher energy per unit volume, which will enhance diffusion and thereby sintering kinetics. See R. M. German, *Sintering Theory and Practice*, New York, N.Y.: Wiley-Interscience, 1996; and B. Zheng et al., *Acta Mater.* 61, 4414 (2013). Neck growth during sintering, for example, increases with decreasing particle size. Another important consequence of the influence of particle size on sintering is related to a temperature reduction with particle size, which can be expressed by:

$$T_2 = \frac{1}{\frac{1}{T_1} - \frac{KM}{Q}\ln\frac{D_2}{D_1}} \quad (3)$$

where $T_1$ and $T_2$ are the sintering temperatures for a change in particle size of $D_1$ and $D_2$, respectively, assuming the sintering time is constant. See R. M. German, *Sintering Theory and Practice*, New York, N.Y.: Wiley-Interscience, 1996. M is a constant, Q is the sintering activation energy, and K is the Bolzmann's gas constant. If $D_2<D_1$ and $T_2<T_1$, then it follows that a smaller particle size and lower sintering temperature should be used to sinter $Fe_xN$ to avoid decomposition.

Two-Step Reactive Milling and High-Pressure SPS Processing

Milling iron powder to form nanocrystalline grains of Fe, greatly facilitates the nitriding process by providing a large number of diffusion pathways such as vacancies, grain boundaries, and dislocations for nitrogen atoms. See W. P. Tong et al., *Science* 299, 686 (2003). As shown in FIG. 1(*a*), cryomilling can be used to form nanostructured Fe powder with a large numbers of vacancies, grain boundaries, and dislocations, which serve as fast diffusion pathways for nitrogen atoms as described above, and create new reactive surfaces through which the nitriding of iron can be enhanced. Cryomilling takes advantage of the low temperature of liquid nitrogen by either suppressing or limiting recovery and recrystallization, leading to a finer grain structure much more quickly when compared to a room temperature milling process. The grain size of the cryogenically milled nanocrystalline iron powder can be less than 1 micron and preferably less than 100 nanometers.

After cryomilling, the nanocrystalline Fe powder can be further milled in an $NH_3$ atmosphere at room temperature (temperatures above or below room temperature can be used as well) for fast nitriding, as shown in FIG. 1(*b*). Ammonia molecules can be broken up during ball milling. See A. Calka and J. I. Nikolov, *Materials Science Forum* 179-181, 333 (1995). This technology can produce monatomic nitrogen, which has higher chemical potential than $N_2$, and can penetrate and diffuse in the solid lattice at low temperatures.

From the viewpoint of thermodynamics, the driving force for nitride formation is enhanced when Fe is nanostructured. It has been reported that the Gibbs free energy change for nitriding in coarse-grained Fe at 500° C. is about −8.22 kJ/mol for the γ'-$Fe_4N$ phase, and −1.69 kJ/mol for the ε-$Fe_{2-3}N$ phase. See W. P. Tong et al., *Science* 299, 686 (2003). Both values become positive at 300° C., implying that these nitrides cannot form at this temperature. The nanostructures induced during cryomilling store a large excess of energy in nonequilibrium defects, such as the grain boundaries, dislocations, and vacancies, which provide an effective driving force for the nitriding process at low temperatures. The stored energy in a ball-milled nanocrystalline Fe sample with 10 nm grain size is estimated to be about 2.3 kJ/mol, and with this contribution, the Gibbs free energy change for nitriding nanocrystalline Fe at 300° C. becomes negative, i.e., the formation of nitrides becomes possible. See H. J. Fecht, *Nanophase Materials: Synthesis, Properties, Applications*, G. C. Hadjipanayis, R. W. Siegel (Eds.), Kluwer Academic, Dordrecht, Netherlands, 1994.

Another very important factor in preserving the nanostructure of a material is its thermal stability, which depends on the balance between driving and resisting forces. It is well known that the smaller the grain size, the bigger the tendency for grain growth. In most cases, the thermal stability of a nanostructure depends on the lattice defects stored between and within grains, and in particles such as nitrides at the grain boundaries. Conventional powder consolidation techniques generally require long thermal cycles and high sintering temperatures with low heating rate, which result in grain growth of nanocrystalline materials. It is known that nanocrystalline iron nitride powders are not sinterable using conventional techniques due to the decomposition and grain growth of nanocrystalline iron nitrides upon sintering at 670° C. and above. Therefore, SPS can be used to obtain fully dense nanocrystalline materials, because of the lower sintering temperature and shorter time required. As described above, in the SPS process a pulsed electric current flows directly in the powder, and a high heating efficiency is achieved. Additionally, the high pressures can limit grain growth while still leading to full densification of bulk, nanocrystalline iron nitride.

Described below is another example of the present invention that uses two-step reactive milling to produce nanocrystalline iron nitride powders prior to high-pressure SPS. Two-step reactive milling has the following benefits: 1) Nitrogen solubility in Fe at normal atmosphere pressure and room temperature is negligible. However, cryomilling can quickly form nanostructured Fe powder with large amounts of lattice defects, dislocations, vacancies, and grain boundaries, which serve as fast diffusion pathways for nitrogen atoms, and through which nitriding of iron can proceed more easily; and 2) Cryomilling takes advantage of the low temperature of liquid nitrogen and leads to finer grain structures much faster. Cryomilled nanocrystalline Fe powder can make the second step of reactive milling in room temperature $NH_3$ for nitriding much shorter and more environmentally-friendly.

As an example of two-step reactive milling, commercial gas atomized pure Fe powder was used as the starting powder. The cryogenic milling was performed with liquid $N_2$ at a temperature of −195° C. A modified attritor was used in a stainless steel tank with an impeller and stainless steel balls. Liquid $N_2$ was continuously introduced into the tank during the milling with the aid of a temperature controller and an attached thermocouple to maintain a constant liquid level in the tank. The Fe powders were cryomilled for 6 to 8 hours in order to reduce the grains to nano-scale sizes. To prevent atmospheric contamination, the powders were always handled in an $N_2$ atmosphere using a closed transfer container and an $N_2$ glove box.

The cryomilled nanocrystalline Fe powder was then milled in anhydrous ammonia. The milling process was carried out in a specially designed ball mill for enhancing reactions between different species in a controlled way. The iron powder was charged and sealed in a stainless-steel vial together with stainless-steel balls. The vial was then evacuated for 15 min and filled with anhydrous ammonia up to 600 kPa, and the nanocrystalline Fe powder was milled at room temperature for up to 50 hours for nanocrystalline iron nitride formation.

Bulk nanocrystalline iron nitride materials were fabricated via SPS of the nanocrystalline iron nitride powders. Powders obtained after two-step reactive milling were consolidated by an SPS apparatus under a $N_2$ or $NH_3$ atmosphere, as shown in FIG. 1(c). Prior to SPS processing the two-step milled nanocrystalline iron nitrides powders were loaded in a graphite die in an $N_2$ glove box to minimize oxidation of the powder. SPS was performed at different temperatures below 600° C., and a high sintering pressure of 350 MPa was used. Very limited porosity was observed in iron nitride samples SPSed at 550° C. and 350 MPa.

The present invention has been described as a method to synthesize bulk iron nitrides. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to synthesize bulk iron nitride, comprising:
cryogenic milling an iron powder at a low temperature to form a nanocrystalline iron powder,
milling the cryogenic milled nanocrystalline iron powder in anhydrous ammonia to provide an iron nitride powder, and
consolidating the iron nitride powder by spark plasma sintering to provide a bulk iron nitride.

2. The method of claim 1, wherein the iron nitride powder is spark plasma sintered at a temperature of less than 600° C. and a pressure of less than 600 MPa.

3. The method of claim 2, wherein the iron nitride powder is spark plasma sintered at a temperature greater than 500° C.

4. The method of claim 2, wherein the iron nitride powder is spark plasma sintered at a pressure greater than 100 MPa.

5. The method of claim 1, wherein the iron powder is cryogenic milled at liquid nitrogen temperature.

6. The method of claim 1, wherein the nanocrystalline iron powder has a grain size less than 100 nanometers.

7. The method of claim 1, wherein the nanocrystalline iron powder is milled in anhydrous ammonia at or near room temperature.

* * * * *